United States Patent
Trim et al.

(10) Patent No.: US 11,645,930 B2
(45) Date of Patent: May 9, 2023

(54) COGNITIVE RECALL OF STUDY TOPICS BY CORRELATION WITH REAL-WORLD USER ENVIRONMENT

(71) Applicant: INTERNATIONAL BUSINESS MACHINES CORPORATION, Armonk, NY (US)

(72) Inventors: Craig M. Trim, Ventura, CA (US); Sarbajit K. Rakshit, Kolkata (IN); Victor Povar, Vancouver (CA); Hernan A. Cunico, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 16/184,010

(22) Filed: Nov. 8, 2018

(65) Prior Publication Data

US 2020/0152072 A1 May 14, 2020

(51) Int. Cl.
*G09B 5/00* (2006.01)
*G09B 5/02* (2006.01)
*G09B 5/06* (2006.01)
*G02B 27/01* (2006.01)

(52) U.S. Cl.
CPC .............. *G09B 5/00* (2013.01); *G09B 5/02* (2013.01); *G09B 5/065* (2013.01); *G02B 27/0101* (2013.01); *G02B 2027/014* (2013.01); *G02B 2027/0141* (2013.01)

(58) Field of Classification Search
CPC . G09B 5/00; G09B 5/02; G09B 5/065; G02B 27/0101; G02B 2027/014; G02B 2027/0141
See application file for complete search history.

(56) References Cited

U.S. PATENT DOCUMENTS

| | | | | |
|---|---|---|---|---|
| 9,418,330 | B2* | 8/2016 | Hamilton, II | G09B 21/00 |
| 9,418,484 | B2* | 8/2016 | Chiu | G09B 5/02 |
| 9,740,949 | B1 | 8/2017 | Khosla et al. | |
| 2002/0052860 | A1* | 5/2002 | Geshwind | G09B 7/02 434/365 |
| 2006/0170652 | A1* | 8/2006 | Bannai | G09B 23/30 345/156 |
| 2008/0299523 | A1* | 12/2008 | Chai | G09B 19/08 434/157 |
| 2009/0226874 | A1* | 9/2009 | Bonasso | G09B 19/0053 434/365 |

(Continued)

OTHER PUBLICATIONS

Antti Ajanki et al., An augmented reality interface to contextual information, Virtual Reality (2011) 15:161-173 (Year: 2011).*
Ryokai, "Off the Paved Paths: Exploring Nature with a Mobile Augmented Reality Learning Tool," International Journal of Mobile Human Computer Interaction, 5:21-49, 2013, 31 pages.

(Continued)

*Primary Examiner* — Eddy Saint-Vil
(74) *Attorney, Agent, or Firm* — Randy Emilio Tejeda; Andrew D. Wright; Calderon Safran & Cole, P.C.

(57) ABSTRACT

A computer-implemented method includes: monitoring, by a computing device, information regarding a user's real-world environment; detecting, by the computing device and based on the monitoring, when the user's real-world environment includes patterns that are correlated with a study topic; and providing, by the computing device, information regarding the study topic for display in a user device based on the detecting.

19 Claims, 8 Drawing Sheets

(56) References Cited

U.S. PATENT DOCUMENTS

| | | | | |
|---|---|---|---|---|
| 2010/0240454 | A1* | 9/2010 | Xiao | G09B 9/08 |
| | | | | 463/30 |
| 2012/0019557 | A1 | 1/2012 | Aronsson et al. | |
| 2012/0045742 | A1* | 2/2012 | Meglan | G09B 23/303 |
| | | | | 434/268 |
| 2013/0323695 | A1* | 12/2013 | Zboray | G09B 19/00 |
| | | | | 434/219 |
| 2014/0081634 | A1* | 3/2014 | Forutanpour | G09B 21/009 |
| | | | | 704/235 |
| 2014/0282105 | A1* | 9/2014 | Nordstrom | G09B 19/003 |
| | | | | 715/753 |
| 2014/0344012 | A1 | 11/2014 | Kamhi et al. | |
| 2016/0071425 | A1* | 3/2016 | Weintraub | G09B 7/00 |
| | | | | 434/350 |
| 2016/0170480 | A1* | 6/2016 | Aonuma | G09B 5/06 |
| | | | | 345/8 |
| 2017/0092151 | A1* | 3/2017 | Xi | G09B 7/00 |

OTHER PUBLICATIONS

Kamarainen, "EcoMOBILE: Integrating augmented reality and probeware with environmental education field trips", Computers & Education, vol. 68, Oct. 2013, pp. 545-556, 12 pages.

Mell et al., "The NIST Definition of Cloud Computing", NIST, Special Publication 800-145, Sep. 2011, 7 pages.

Toyama et al., "Attention Engagement and Cognitive State Analysis for Augmented Reality Text Display Functions", IUI '15 Proceedings of the 20th International Conference on Intelligent User Interfaces pp. 322-332, Atlanta, Georgia, Mar. 29-Apr. 1, 2015, 1 page.

* cited by examiner

COGNITIVE RECALL OF STUDY TOPICS BY CORRELATION WITH REAL-WORLD USER ENVIRONMENT

BACKGROUND

The present invention generally relates to cognitive recall of study topics and, more particularly, to cognitive recall of study topics by correlation with real-world user environment.

Education techniques include the use of various types of study material. For example, study material ranges from textbooks, live and online lectures, live and online classroom instruction, laboratory instruction, educational videos, audiobooks, etc. These materials and techniques are used for a variety of education topics, ranging from history, mathematics, applied sciences, trade studies, etc.

SUMMARY

In an aspect of the invention, a computer-implemented method includes: monitoring, by a computing device, information regarding a user's real-world environment; detecting, by the computing device and based on the monitoring, when the user's real-world environment includes patterns that are correlated with a study topic; and providing, by the computing device, information regarding the study topic for display in a user device based on the detecting In an aspect of the invention, there is a computer program product comprising a computer readable storage medium having program instructions embodied therewith. The program instructions executable by a computing device to cause the computing device to: monitor information regarding a user's real-world environment; access a repository that stores information correlating real-world patterns with patterns associated with a study topic; detect, based on the monitoring and the accessing, when the user's real-world environment includes the patterns that are correlated with the study topic; and provide information regarding the study topic for display in a wearable augmented reality device based on the detecting.

In an aspect of the invention, a system includes: a processor, a computer readable memory and a computer readable storage medium associated with a computing device; program instructions to monitor information regarding a user's real-world environment; program instructions to detect, based on the monitoring, when the user's real-world environment includes patterns that are correlated with a study topic; and program instructions to provide information regarding the study topic for display in a wearable augmented reality device based on the detecting, wherein the information regarding the study topic is viewable with the user's real-world environment. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
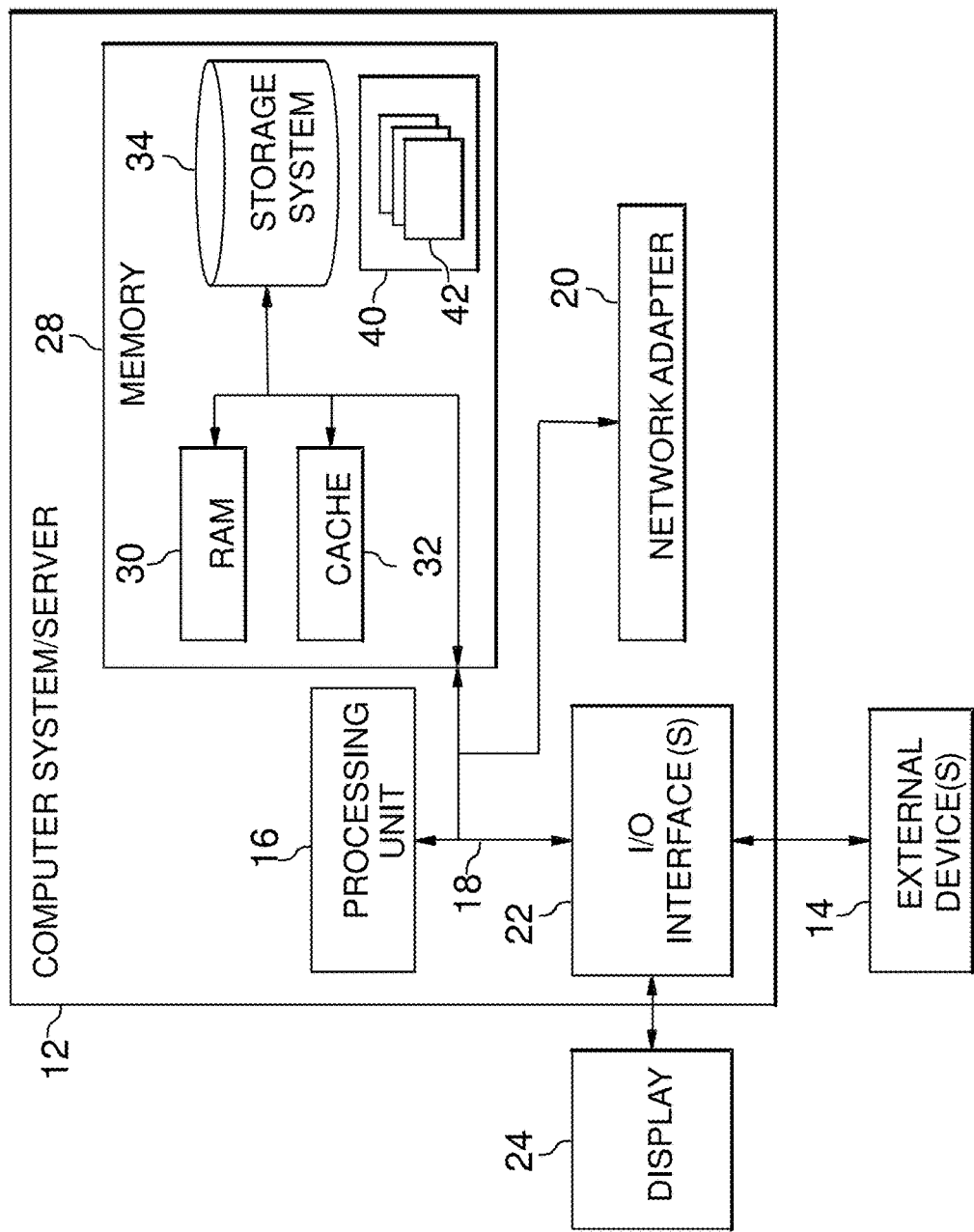
FIG. 1 depicts a cloud computing node according to an embodiment of the present invention.

The present invention generally relates to cognitive recall of study topics and, more particularly, to cognitive recall of study topics by correlation with real-world user environment. A students' learning experience and ability to comprehend new concepts, topics, and information (e.g., from a school curriculum or other learning environment) may be improved when the student can see or experience study topics from the classroom in a real-world environment. For example, if a student is studying physics in school, the student's comprehension of physics concepts may be reinforced or improved when the student sees those concepts from the classroom, textbooks, and other study materials apply in a real-world situation. Accordingly, aspects of the present invention monitor a student's real-world environment, and detect when the user's physical surroundings include experiences and patterns that correlate to the user's study topics.

In embodiments, aspects of the present invention implement a user device (e.g., a wearable device, such as augmented reality glasses, smart contact lenses, or the like) which superimposes or displays a virtual window having information about a study topic in or around the user's field of view (or peripheral view) of the physical world. In embodiments, aspects of the present invention detect when a user's field of view of the real-world physical environment includes patterns (e.g., visual patterns, actions, natural language patterns, concepts, objects, sounds, locations, landmarks, etc.) that are correlated to a study topic being studied by the user. As an illustrative, non-limiting example, aspects of the present invention detect when a user's field of view of the real-world physical environment includes visual patterns consistent with a physics concept that is a current topic of study for the user. More specifically to this illustrative example, aspects of the present invention detect that the user's field of view of real-world physical environment includes a view of vehicle driving down an inclined surface, and that this action is consistent with or correlated to a physics concept of determining the acceleration of a rolling ball down an inclined service. Continuing with this example, aspects of the present invention display (e.g., within augmented reality glasses, head-mounted display, smart contacts lenses, etc.) information regarding the topic to assist the user by "connecting the dots" between a topic that the user has seen in their studies with a real-world example of the topic being present in a real-world situation. In this way, the user's comprehension and interest of the study topic is and the user's overall learning experience is improved.

As another example, if the user has recently studied about parabolic motion, and the user is watching a sporting event, such as football or cricket, aspects of the present invention detect that the motions from the user's real-world experience of watching the sporting event correlate to the user's recent study of parabolic motions. Accordingly, aspects of the present invention visually display information about the study topic within the user's wearable device. For example, aspects of the present invention display excerpts from a textbook, or a video clip explaining the study topic, along with a brief description as to the similarities between the study topic and real-world environment that the user is currently experiencing.

As described herein, aspects of the present invention build a repository that stores information correlating real-world scenarios and patterns to study topics. For example, aspects of the present invention access study material for a study topic (e.g., textbooks, videos, audiobooks, lectures, etc.) and apply various types of analysis to the study material to identify patterns, objections, sounds, actions, landmarks, locations, etc. associated with the study topic. When similar patterns, objections, sounds, actions, landmarks, locations, etc. are present in the user's real-world environment, aspects of the present invention detect that the user's real-world environment is relevant to the study topic, and information about the study topic is cognitively recalled and presented to the user.

In embodiments, aspects of the present invention determine the effectiveness of the presentation of a study topic in connection with the user's environment by monitoring the user's biometrics and/or behaviors/conversations after a study topic has been presented in connection with the user's environment. For example, aspects of the present invention determine a level of comprehension of the study topic based on the biometrics data/user behavior. In embodiments, if the level of comprehension is beneath a predetermined threshold limit (which can be predetermined or dynamically altered in a decreasing threshold to account for an energy decline over a period of time), aspects of the present invention modify the presentation of the study topic to help improve the user's comprehension. In embodiments, aspects of the present invention display information to demonstrate how the study topic is relevant to the user's real-world environment/experience (e.g., by identifying similarities between the patterns/object/sounds/actions of the study topic with those of the real-world environment).

Aspects of the present invention provide a solution to the problem of improving the learning comprehension of a user/student by correlating study topics from a classroom environment and from textbooks to real-world examples through the use of cognitive computing techniques (e.g., through the use of specific criteria used for the correlating). Aspects of the present invention improve the functioning of computer systems and computing devices in a way such that the computer systems and computing devices perform functions that were not previously performed. Further, aspects of the present invention provide a particular method of using raw data from sensors in a particular configuration to achieve a solution to a problem in the art of teaching.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
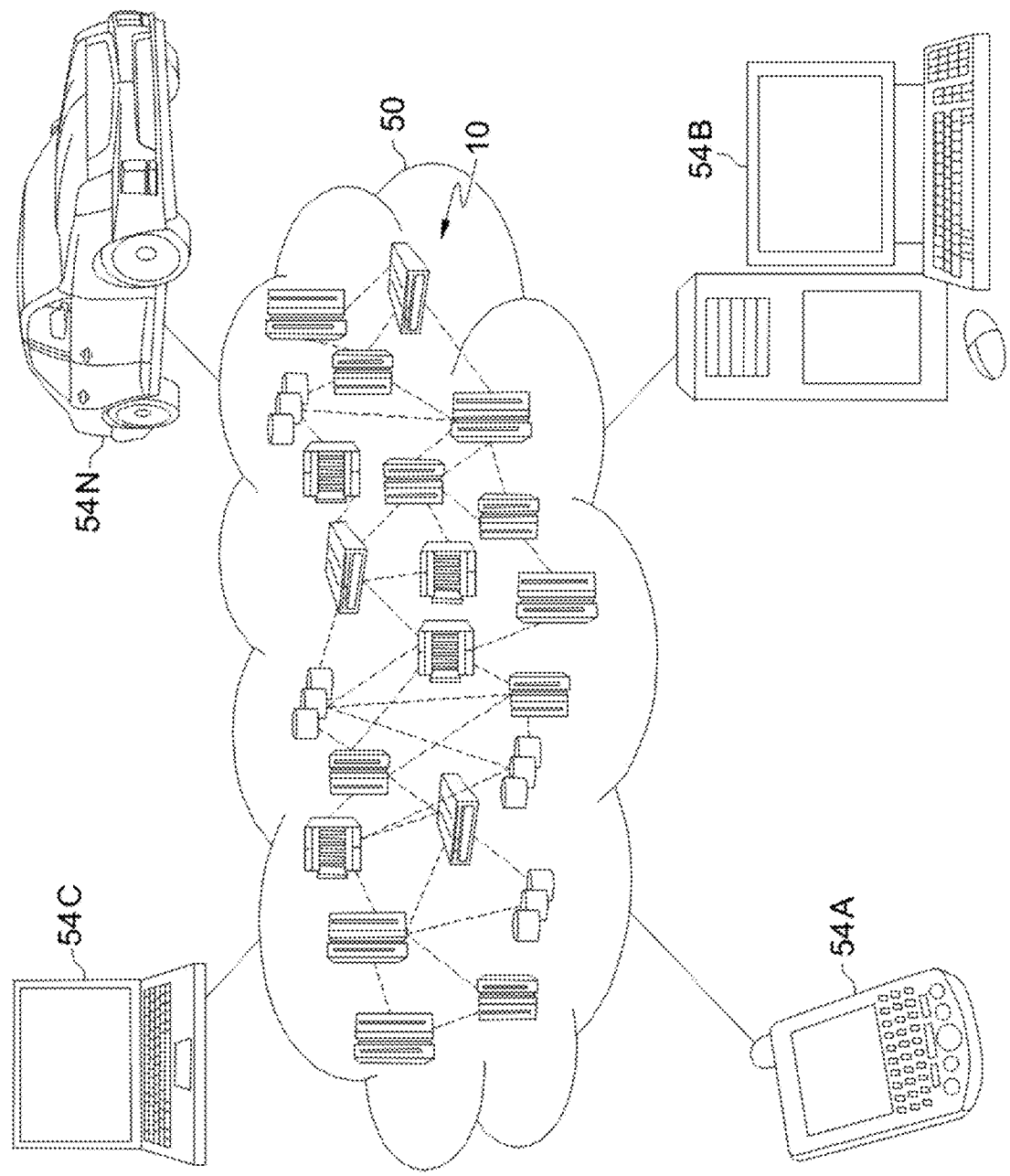
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
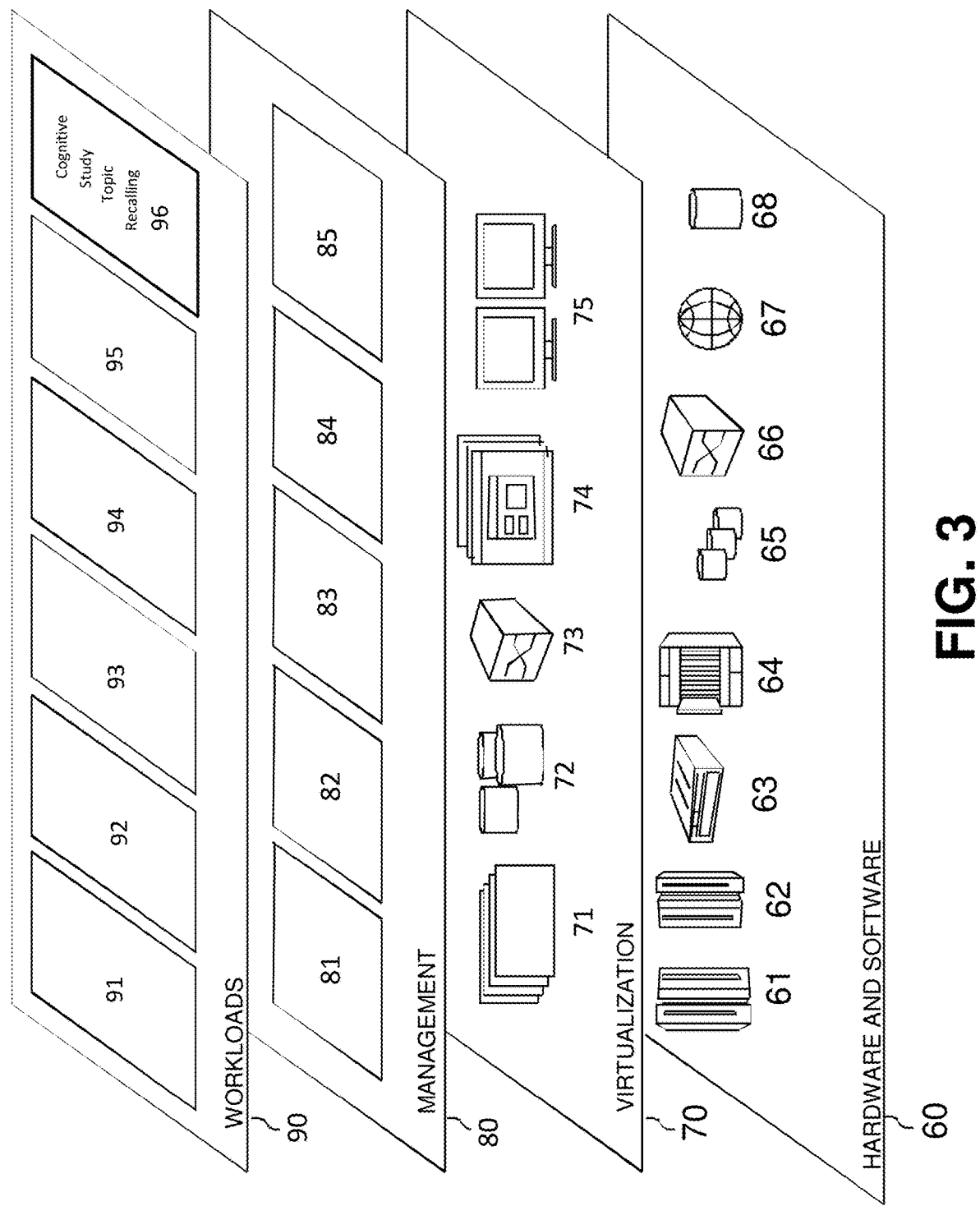
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive study topic recalling 96.

Referring back to FIG. 1, the program/utility 40 may include one or more program modules 42 that generally carry out the functions and/or methodologies of embodiments of the invention as described herein (e.g., such as the functionality provided by cognitive study topic recalling 96). Specifically, the program modules 42 may build a repository of information that correlates study topics with real-world situations and environments, monitor a user's real-world environment, access the repository to detect when the user's environment includes patterns that are correlated with a study topic, and provide information about the study topic for display in a user device in connection with the user's environment (e.g., in an augmented reality wearable computing device, etc.) Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a cognitive study topic recall system 220 as shown in FIG. 5.

Figure 4:
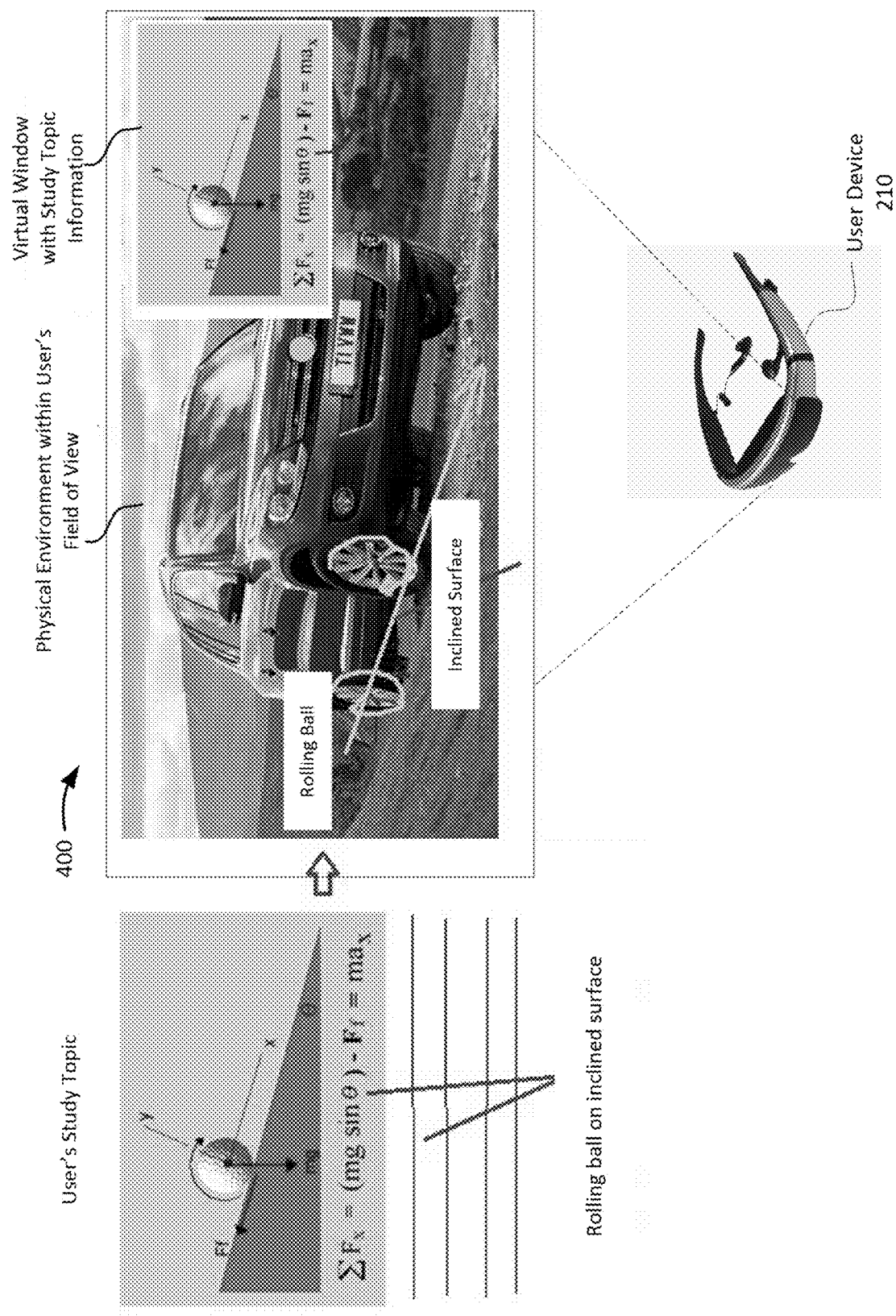
FIG. 4 shows an overview of an example implementation in accordance with aspects of the present invention.

FIG. 4 shows an overview of an example implementation in accordance with aspects of the present invention. As shown in FIG. 4, a user device 210 (e.g., a wearable computing device, such as smart glasses or an augmented reality device), displays a virtual window with information from a study topic that a user is currently studying. In the illustrative example of FIG. 4, the study topic relates to the physics/dynamics of a ball rolling down an inclined surface. Continuing with this example, the user's field of view of the real-world physical environment (e.g., as seen by the user device 210) includes a vehicle on an inclined surface. Accordingly, the user device 210 displays a virtual window of the study topic in the virtual window in which the study topic resembles and/or relates to the user's real-world physical environment (e.g., what is being seen by the user in real-world, the user's location, etc.).

As shown in FIG. 4, the virtual window is placed in position that is in a field of view or in a peripheral field of view off to the side of the user's field of view of the physical world. In embodiments, the study topic shown in the virtual window includes material from a textbook, article, or the like. In embodiments, the study topic is presented in the form of still images/diagrams, text, audio, and/or video. It is noted that the user's field of view of the real-world physical environment (as seen by the user device 210) may include either the presence of physical objects and/or a view of a television or computer display. In the example of FIG. 4, the user's field of view of the vehicle on the inclined surface could either be that of a real-world vehicle or a vehicle that is shown on a display (e.g., a television or computer display). As described herein, the display of a study topic correlated to the user's real-world physical environment improves the user's learning experience and comprehension of the study topic.

Figure 5:
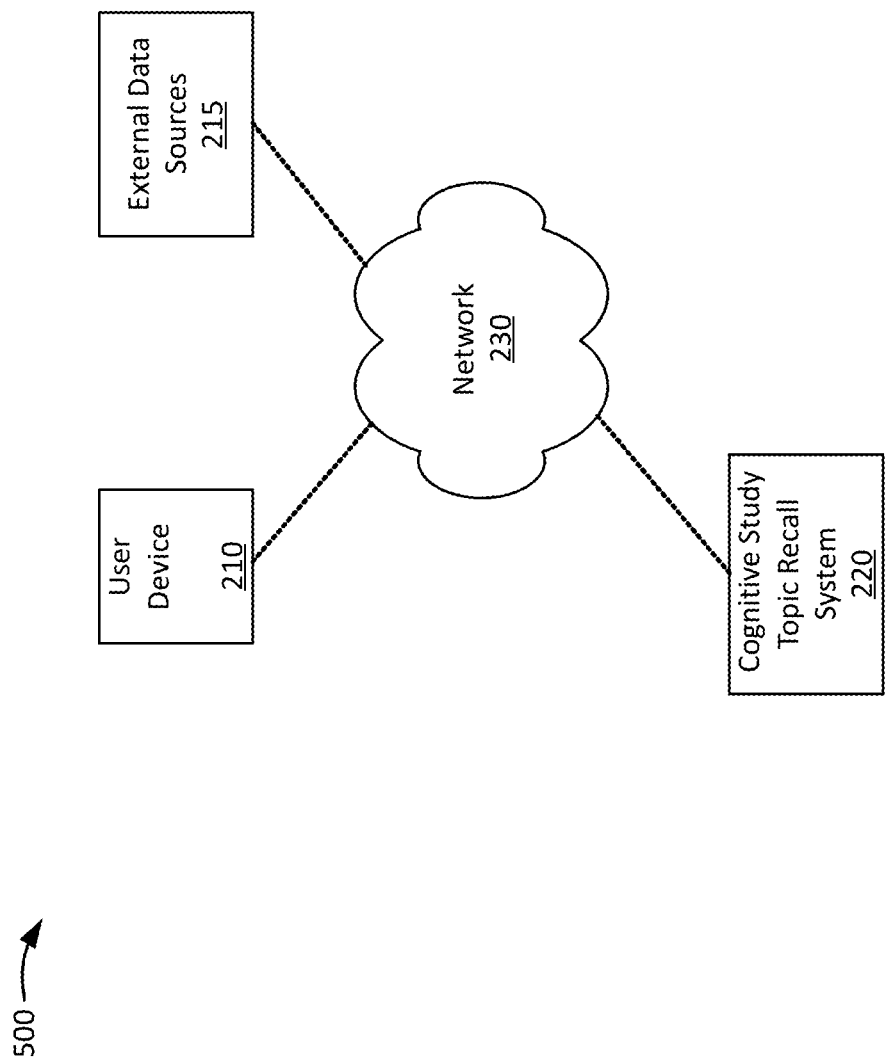
FIG. 5 shows an example environment in accordance with aspects of the present invention.

FIG. 5 shows an example environment in accordance with aspects of the present invention. As shown in FIG. 5, environment 500 includes a user device 210, external data sources 215, a cognitive study topic recall system 220, and a network 230. In embodiments, one or more components in environment 500 may correspond to one or more components in the cloud computing environment of FIG. 2. In embodiments, one or more components in environment 500 may include the components of computer system/server 12 of FIG. 1.

The user device 210 includes a computing device capable of communicating via a network, such as the network 230. In example embodiments, the user device 210 corresponds to a wearable computing device (e.g., augmented reality glasses, smart contacts lenses, etc.). Additionally, or alternatively, the user device 210 includes a mobile communication device (e.g., a smart phone or a personal digital assistant (PDA)), a portable computer device (e.g., a laptop or a tablet computer), a desktop computer, and/or another type of computing device. In some embodiments, the user device 210 includes one or more sensors/camera devices that provide information regarding the user's physical real-world environment (e.g., video/images of a field of view of the environment, climate data regarding the environment, etc.). As described herein, the user device 210 communicates with the cognitive study topic recall system 220 to receive study topics related to the user's current physical real-world environment, and to display the study topics (e.g., in a computer, smartphone, or tablet display, within an augmented reality display, etc.).

The external data sources 215 include one or more computing devices (e.g., such as computer system/server 12 of FIG. 1) that store information regarding study topics, such as information from textbooks, articles, online courses, lectures, audiobooks, videos, etc. Additionally, or alternatively, the external data sources 215 store information from a syllabus, as well as user profile information indicating topics that a user is currently studying (e.g., from class registration data, class activity data, etc.). For example, in embodiments, the user profile stores information from an online learning management system that identifies classroom/study assignments/projects assigned to or completed by the user.

The cognitive study topic recall system 220 includes one or more computing devices (e.g., such as computer system/server 12 of FIG. 1) that builds a repository of information that correlates study topics with real-world situations, environments, and patterns (e.g., visual patterns, actions, objects, sounds, locations, landmarks, etc.). Additionally, or alternatively, the cognitive study topic recall system 220 monitors a user's real-world environment (e.g., the user's field of view as seen by the user device 210, the user's location, etc.). Further, the cognitive study topic recall system 220 accesses the repository to detect when the user's environment includes patterns (e.g., visual patterns, actions, objects, sounds, locations, landmarks, etc.) that are correlated with a study topic, and provides information about the study topic for display in the user device 210 in connection with the user's environment (e.g., in an augmented reality wearable computing device, a smartphone, tablet, or computer display, etc.).

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
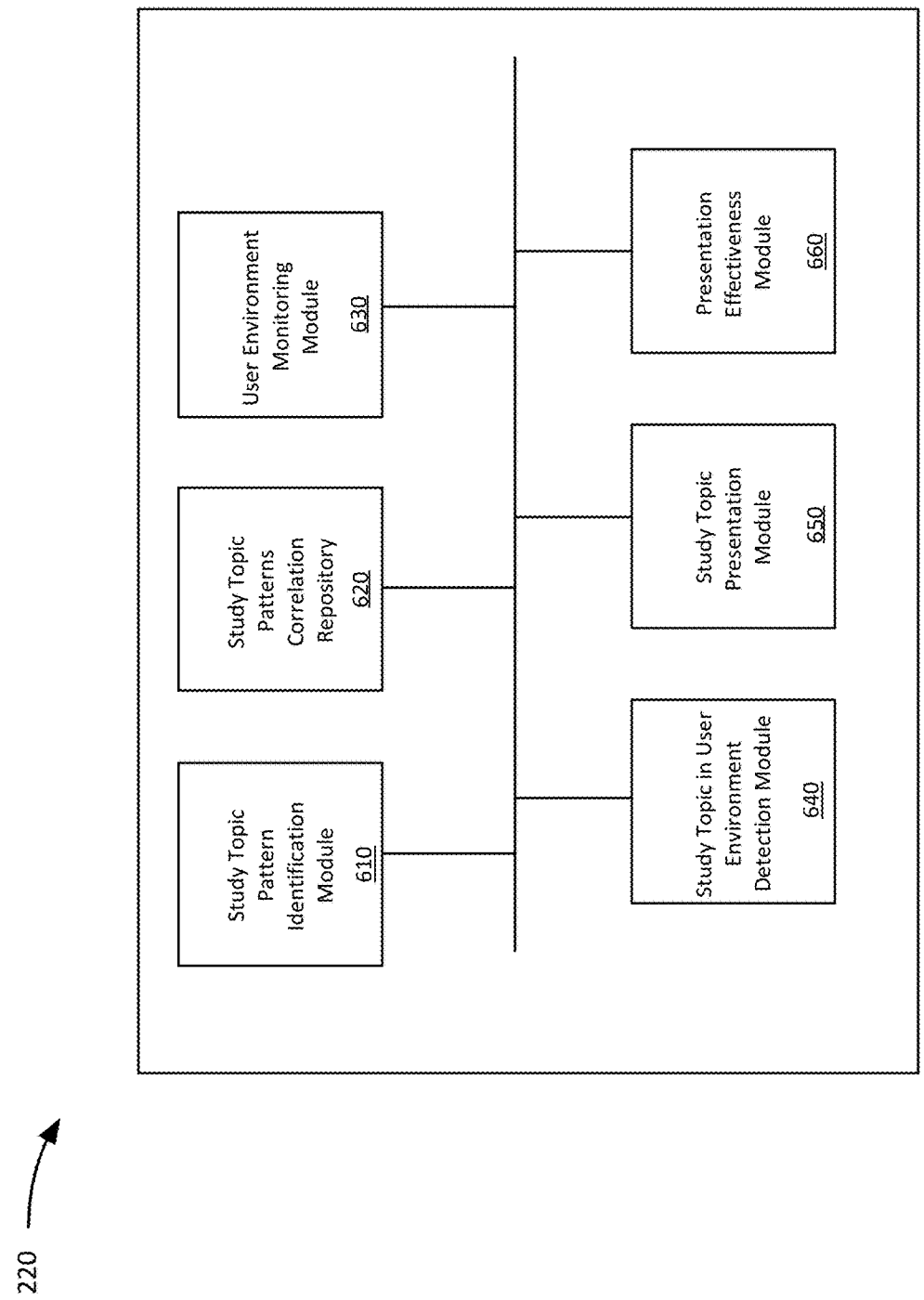
FIG. 6 shows a block diagram of example components of a cognitive study topic recall system in accordance with aspects of the present invention.

FIG. 6 shows a block diagram of example components of a cognitive study topic recall system 220 in accordance with aspects of the present invention. As shown in FIG. 6, the cognitive study topic recall system 220 includes a study topic pattern identification module 610, a study topic patterns correlation repository 620, a user environment monitoring module 630, a study topic in user environment detection module 640, a study topic presentation module 650, and a presentation effectiveness module 660. In embodiments, the cognitive study topic recall system 220 may include additional or fewer components than those shown in FIG. 6. In embodiments, separate components may be integrated into a single computing component or module. Additionally, or alternatively, a single component may be implemented as multiple computing components or modules.

The study topic pattern identification module 610 includes a program module (e.g., program module 42 of FIG. 1) that obtains data of a study topic (e.g., text, images, diagrams, graphics, videos, audio, lectures, etc.) and analyzes the study topic data to identify patterns associated with the study topic data (e.g., visual patterns, natural language patterns, concepts, actions, objects, sounds, locations, landmarks, etc.). For example, the study topic pattern identification module 610 applies natural language classification to the study topic data, image-based classification to the study topic data, and/or other type of analysis to the study topic data to identify the patterns associated with the study topic data. As an example, the study topic pattern identification module 610 identifies the visual patterns and actions associated with the study topic relating to parabolic motions/trajectory of objections. Similarly, the study topic pattern identification module 610 identifies the locations associated with study topics related to history (e.g., historical landmarks, history museums featuring certain topics of study, etc.). As another example, the study topic pattern identification module 610 identifies actions/sounds/animals of study topics related to zoology/entomology.

The study topic patterns correlation repository 620 includes a data storage device (e.g., storage system 34 of FIG. 1) that stores the patterns of a study topic (e.g., as identified by the study topic pattern identification module 610) to correlate those patterns with the patterns of a user's real-world environment. For example, as described herein, data stored by the study topic patterns correlation repository 620 is later accessed to detect when the user's real-world environment includes patterns that resemble or match (e.g., to a threshold degree) the patterns of a study topic.

The user environment monitoring module 630 includes a program module (e.g., program module 42 of FIG. 1) that monitors sensor data corresponding to the user's real-world environment. For example, the user environment monitoring module 630 monitors sensor data received from the user device 210, such as video data of the user's field of view as seen by the user device 210. Additionally, or alternatively, the user environment monitoring module 630 receives and monitors audio data, climate/temperature data, biometrics data, etc.

The study topic in user environment detection module 640 includes a program module (e.g., program module 42 of FIG. 1) that detects when the user's real-world physical environment includes patterns (e.g., visual patterns, actions, natural language patterns, concepts, objects, sounds, locations, landmarks, etc.) that corresponds to a study topic being studied by the user. In embodiments, the study topic in user environment detection module 640 identifies the user (e.g., based on username/password, biometrics information, faceprint/voiceprint identification, etc.) and accesses information (e.g., from the external data sources 215) to identify which study topics are currently being studied by the user. For example, the study topic in user environment detection module 640 identifies which study topics are currently being studied by the user based on a curriculum, syllabus, educational calendar, etc. Additionally, or alternatively, the study topic in user environment detection module 640 determines which study topics are currently being studied by the user based on the user's activities as stored by a user profile.

In embodiments, once the study topic in user environment detection module 640 has identified which study topics are currently being studied by the user, the study topic in user environment detection module 640 access the patterns associated with the study topic from the study topic patterns correlation repository 620. From the patterns stored by the study topic patterns correlation repository 620, the study topic in user environment detection module 640 detects when the user's environment (e.g., as monitored by the user environment monitoring module 630) includes patterns that resemble or match (e.g., to within a threshold degree) the patterns of one or more of the identified study topics being studied by the user.

The study topic presentation module 650 includes a program module (e.g., program module 42 of FIG. 1) that outputs information regarding the study topic having patterns that resemble the user's environment (e.g., as determined by the study topic in user environment detection module 640). In embodiments, the study topic presentation module 650 outputs the information regarding the study topic to the user device 210 for display by the user device 210 (e.g., in a virtual window within augmented reality glasses or smart contacts, a display of a smartphone, tablet, or computer, etc.). In embodiments, the study topic presentation module 650 determines what type of information to output to the user device 210 (e.g., video, text, diagrams, graphics, audio, etc.) based on user preferences, or based on what type of information is appropriate for the user's current activity. As described herein, in an example embodiment, the user device 210 displays the information regarding the study topic within a virtual window that is within a field of view of the user (e.g., direct field of view or peripheral field of view). In embodiments, the location in which the virtual window is displayed is user configurable and/or moveable. In embodiments, a default location in which the virtual window is displayed is based on user preferences and/or the user's activity (e.g., the virtual window will not be displayed directly in the user's field of view if the user is driving). In embodiments, if multiple study topics are detected by the study topic in user environment detection module 640, the study topic presentation module 650 implements any suitable conflict resolution technique to select one of the study topics, or displays multiple study topics (e.g., in a split-screen mode) within the virtual window.

The presentation effectiveness module 660 includes a program module (e.g., program module 42 of FIG. 1) that determines an effectiveness of the presentation of the study topic. For example, the presentation effectiveness module 660 obtains and monitors the user's responses (e.g., biometrics responses, audible responses, user-inputted responses, etc.) In embodiments, the presentation effectiveness module 660 obtains and monitors the user's responses from one or more user devices 210 associated with the user after the study topic has been displayed. Further, the presentation effectiveness module 660 determines the user's level of comprehension based on the user's responses. As an illustrative example, the user may indicate through biometrics responses, user inputs, and/or spoken words that the user has better comprehended the study topic or has found the presentation of the study topic to be interesting. In embodiments, the presentation effectiveness module 660 modifies the display of the study topic if the user's comprehension level is less than a threshold level. For example, the presentation effectiveness module 660 displays other texts, graphics, diagrams, etc. if the original display of the study topic was ineffective (e.g., if the comprehension level was less than the threshold level).

Figure 7:
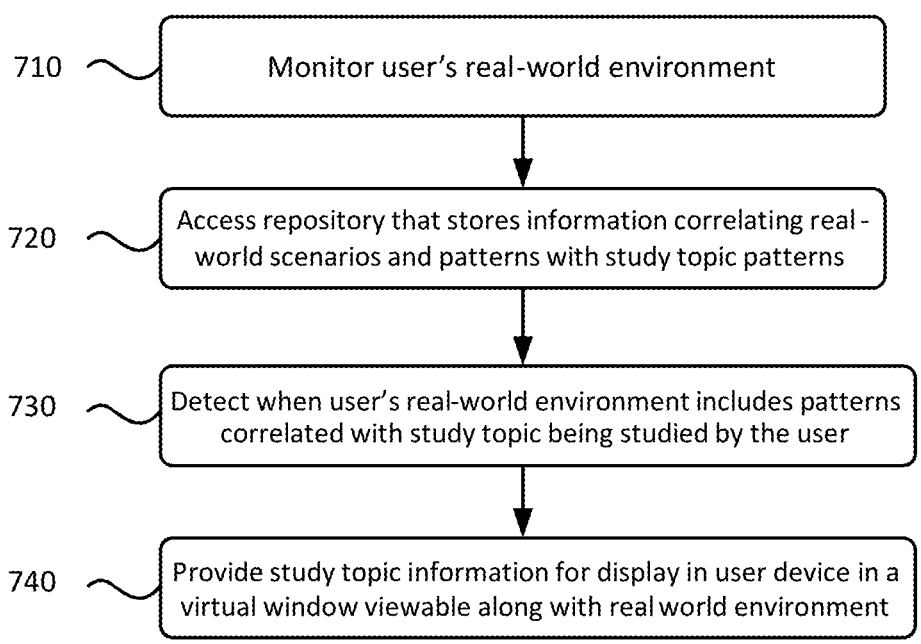
FIG. 7 shows an example flowchart of a process for cognitively recalling a study topic based on the user's environment and presenting the study topic to the user in accordance with aspects of the present invention.

FIG. 7 shows an example flowchart of a process for cognitively recalling a study topic based on the user's environment and presenting the study topic to the user. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 includes monitoring a user's real-world environment (step 710). For example, as described above with respect to the user environment monitoring module 630, the cognitive study topic recall system 220 monitors sensor data corresponding to the user's real-world environment. In embodiments, the cognitive study topic recall system 220 monitors sensor data received from the user device 210, such as video data of the user's field of view as seen by the user device 210, the user's location, etc. Additionally, or alternatively, the cognitive study topic recall system 220 receives and monitors other data relating to the user's real-world environment, such as audio data, climate/temperature data, biometrics data, etc.

Process 700 also includes accessing a repository that stores information correlating real-world scenarios and patterns with study topic patterns (step 720). For example, as described above with respect to the study topic pattern identification module 610 and the study topic patterns correlation repository 620, the cognitive study topic recall system 220 accesses a repository (e.g., the study topic patterns correlation repository 620 that is built based on the operations of the study topic pattern identification module 610).

Process 700 further includes detecting when the user's real-world environment includes patterns correlated with a study topic being studied by the user (step 730). For example, as described above with respect to the study topic in user environment detection module 640, the cognitive study topic recall system 220 detects when the user's real-world physical environment includes patterns (e.g., visual patterns, actions, natural language patterns, concepts, objects, sounds, locations, landmarks, etc.) that corresponds to a study topic being studied by the user. From the patterns of the study topic (accessed at step 720), the cognitive study topic recall system 220 detects when the user's environment, (e.g., as monitored at step 710) includes patterns that resemble or match (e.g., to within a threshold degree) the patterns of one or more of the identified study topics being studied by the user.

Process 700 also includes providing study topic information for display in a user device in a virtual window that is viewable along with the real-world environment (step 740). For example, as described above with respect to the study topic presentation module 650, the cognitive study topic recall system 220 outputs information regarding the study topic having patterns that resemble the user's environment (e.g., as determined by the study topic in user environment detection module 640). In embodiments, the cognitive study topic recall system 220 outputs the information regarding the study topic to the user device 210 for display by the user device 210 (e.g., in a virtual window within augmented reality glasses or smart contacts, a display of a smartphone, tablet, or computer, etc.).

Figure 8:
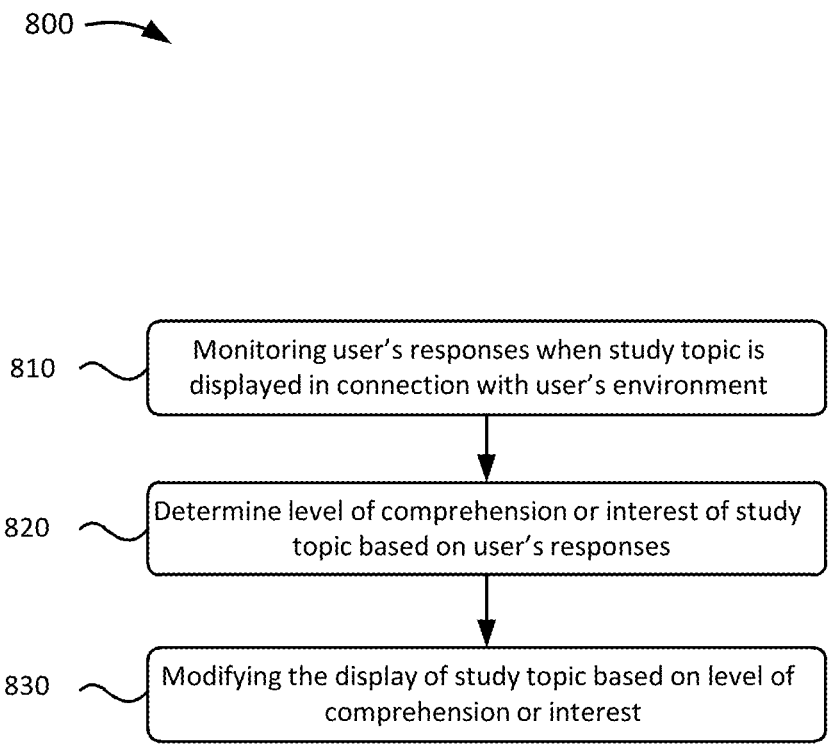
FIG. 8 shows an example flowchart of a process for determining an effectiveness of the displaying of the study topic in accordance with aspects of the present invention.

FIG. 8 shows an example flowchart of a process for determining an effectiveness of the displaying of the study topic. The steps of FIG. 8 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 8, process 800 includes monitoring a user's responses when study topic is displayed in connection with the user's environment (step 810). For example, the cognitive study topic recall system 220 obtains and monitors the user's responses (e.g., biometrics responses, audible responses, user-inputted responses, etc.) In embodiments, the cognitive study topic recall system 220 obtains and monitors the user's responses from one or more user devices 210 associated with the user after the study topic has been displayed (e.g., after the occurrence of step 740).

Process 800 also includes determining a level of comprehension or interest of study topic based on the user's responses (step 820). For example, as described above with respect to the presentation effectiveness module 660, the cognitive study topic recall system 220 determines the user's level of comprehension based on the user's responses. As an illustrative example, the user may indicate through biometrics responses, user inputs, and/or spoken words that the user has better comprehended the study topic or has found the presentation of the study topic to be interesting.

Process 800 further includes modifying the display of the study topic based on the level of comprehension or interest (step 830). For example, as described above with respect to the presentation effectiveness module 660, the cognitive study topic recall system 220 modifies the display of the study topic if the user's comprehension level is less than a threshold level. For example, the cognitive study topic recall system 220 provides instructions to the user device 210 to display other texts, graphics, diagrams, etc. if the original display of the study topic was ineffective (e.g., if the comprehension level was less than the threshold level). Additionally, or alternatively, the cognitive study topic recall system 220 provides instructions to the user device 210 to discontinue display of the study topic altogether.

In embodiments, aspects of the present invention augment real events with information to teach the user a topic by identifying a topic of interest or being studied by a user (e.g., from historical data such as registered classes, video data such as notes or presentations, etc.); determining real-world scenarios in which the topic could be visually displayed (e.g., a use case); identifying if a use case is available to the user via the users current environment; and responsive to determining a use case if available, augment a visual display to demonstrate the topic based on the use case currently in the users environment. In embodiments, aspects of the present invention monitor biometric data of the user to determine if the user is interested/understanding the use case being displayed; and further augmenting or turning off the display based upon the monitoring and updating the user's policy based upon the monitored data.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
monitoring, by a computing device, information regarding a real-world environment of a user, wherein the monitoring comprises the computing device receiving the information regarding the real-world environment of the user from a wearable augmented reality device worn by the user and via a wireless network;
automatically detecting, by the computing device and based on the monitoring, when the-real-world environment of the user includes real-world patterns that are correlated with patterns associated with a study topic; and
causing, by the computing device, a display of information regarding the study topic in the wearable augmented reality device based on the detecting,
wherein the displayed information comprises information regarding the study topic appropriate for a current activity of the user, the display of the information is in a virtual window displayed in the wearable augmented reality device, and the virtual window is displayed outside of a direct field of view of the user based on the current activity of the user.

2. The computer-implemented method of claim 1, wherein the wearable augmented reality device comprises a sensor providing the information regarding the real-world environment of the user.

3. The computer-implemented method of claim 2, wherein the real-world environment of the user includes a field of view of the user as seen by the wearable augmented reality device,
wherein the detecting includes obtaining climate data regarding the real-world environment of the user.

4. The computer-implemented method of claim 1, further comprising accessing a repository that stores information correlating real-world patterns with the patterns associated with the study topic,
wherein the detecting is based on the accessing the repository,
wherein the patterns associated with the study topic are derived from analysis of a study material.

5. The computer-implemented method of claim 4, wherein the patterns associated with the study topic include at least one selected from the group consisting of:
actions;
sounds; and
natural language patterns.

6. The computer-implemented method of claim 1, further comprising identifying the study topic based on at least one selected from the group consisting of:
a curriculum; a syllabus; and
an educational calendar,
wherein the detecting is based on the identifying the study topic.

7. The computer-implemented method of claim 1, further comprising: monitoring user responses when the study topic is displayed;
determining a level of comprehension or interest of the study topic based on the user responses; and
modifying a manner in which the study topic is displayed based on the level of comprehension or interest of the study topic.

8. The computer-implemented method of claim 7, wherein the modifying the manner in which the study topic is displayed includes
modifying text, graphics, or diagrams related to the study topic,
wherein the determining a level of comprehension or interest of the study topic based on the user responses comprises monitoring user behavior or user conversation after the study topic has been displayed in connection with the real-world environment of the user.

9. The computer-implemented method of claim 1, wherein a service provider at least one of creates, maintains, deploys and supports the computing device.

10. The computer-implemented method of claim 1, wherein the monitoring the information regarding the real-world environment of the user, the detecting when the real-world environment of the user includes patterns that are correlated with the study topic, and the providing the information regarding the study topic are provided by a service provider on a subscription, advertising, and/or fee basis.

11. The computer-implemented method of claim 1, wherein the computing device includes software provided as a service in a cloud environment.

12. The computer-implemented method of claim 1, further comprising deploying a system, wherein the deploying the system comprises providing a computer infrastructure operable to perform the monitoring the information regarding the real-world environment of the user, the detecting when the real-world environment of the user includes patterns that are correlated with the study topic, and the providing the information regarding the study topic.

13. A computer program product comprising a computer readable storage medium having program instructions embodied therewith, the program instructions executable by a computing device to cause the computing device to:
monitor, by a user environment monitoring module of the computing device, information regarding a real-world environment of a user from one or more sensors of a wearable augmented reality device, wherein the monitoring comprises detecting a motion in the real-world environment of the user;
access, by an environment detection module of the computing device, a repository that stores information correlating real-world patterns with patterns associated with a study topic;
detect, by the environment detection module of the computing device, based on the monitoring and the accessing, when the real-world environment of the user includes the real-world patterns that are correlated with the patterns associated with the study topic; and
provide, by a study topic presentation module of the computing device, information regarding the study topic for display in the wearable augmented reality device based on the detecting,
wherein the display of the information is in a virtual window displayed in the wearable augmented reality device, and the virtual window is displayed outside of a field of view of the user based on a current activity of the user.

14. The computer program product of claim 13, wherein the real-world environment of the user includes field of view of the user as seen by one or more of the sensors of the wearable augmented reality device, wherein the one or more of the sensors include at least one camera.

15. The computer program product of claim 13,
wherein the detecting includes more than one pattern that are correlated with the study topics,
wherein the virtual window viewable within the wearable augmented reality device displays multiple study topics in a split screen mode.

16. The computer program product of claim 15, wherein the information regarding the study topic includes at least one selected from the group consisting of:
text;
a graphic;
a diagram; and
a video.

17. The computer program product of claim 16, wherein the information regarding the study topic is viewable with the real-world environment of the user, and
wherein the real-world pattern is a real-world situation.

18. A system comprising:
a processor and a computer readable storage medium associated with a computing device;
program instructions to monitor information regarding a real-world environment of a user;
program instructions to detect, based on the monitoring, when the real-world environment of the user includes real-world patterns that are correlated with patterns associated with a study topic;
program instructions to provide information regarding the study topic for display in a wearable augmented reality device based on the detecting, wherein the information regarding the study topic is superimposed with the real-world environment of the user in the wearable augmented reality device,
wherein the display of the information is in a virtual window displayed in the wearable augmented reality device, and the virtual window is displayed outside of a field of view of the user based on a current activity of the user,
program instructions to monitor user responses when the study topic is displayed;
wherein the monitoring the user responses is accomplished with multiple user devices,
program instructions to determine a level of comprehension or interest of the study topic based on the user responses;
program instructions to monitor biometric data of the user to determine a level of comprehension or interest of the study topic based on the user responses; and
program instructions to modify a manner in which the study topic is displayed based on the level of comprehension or interest of the study topic,
wherein the modification of the manner in which the study topic is displayed includes displaying other texts based on the level of comprehension being less than a threshold comprehension level,
wherein the program instructions are stored on the computer readable storage medium for execution by the processor.

19. The system of claim 18, wherein the program instructions to modify a manner in which the study topic is displayed based on the level of comprehension or interest of the study topic includes dynamically altering a predetermined threshold limit for comprehension in a decreasing manner over a period of time.

* * * * *